Patented Apr. 15, 1930

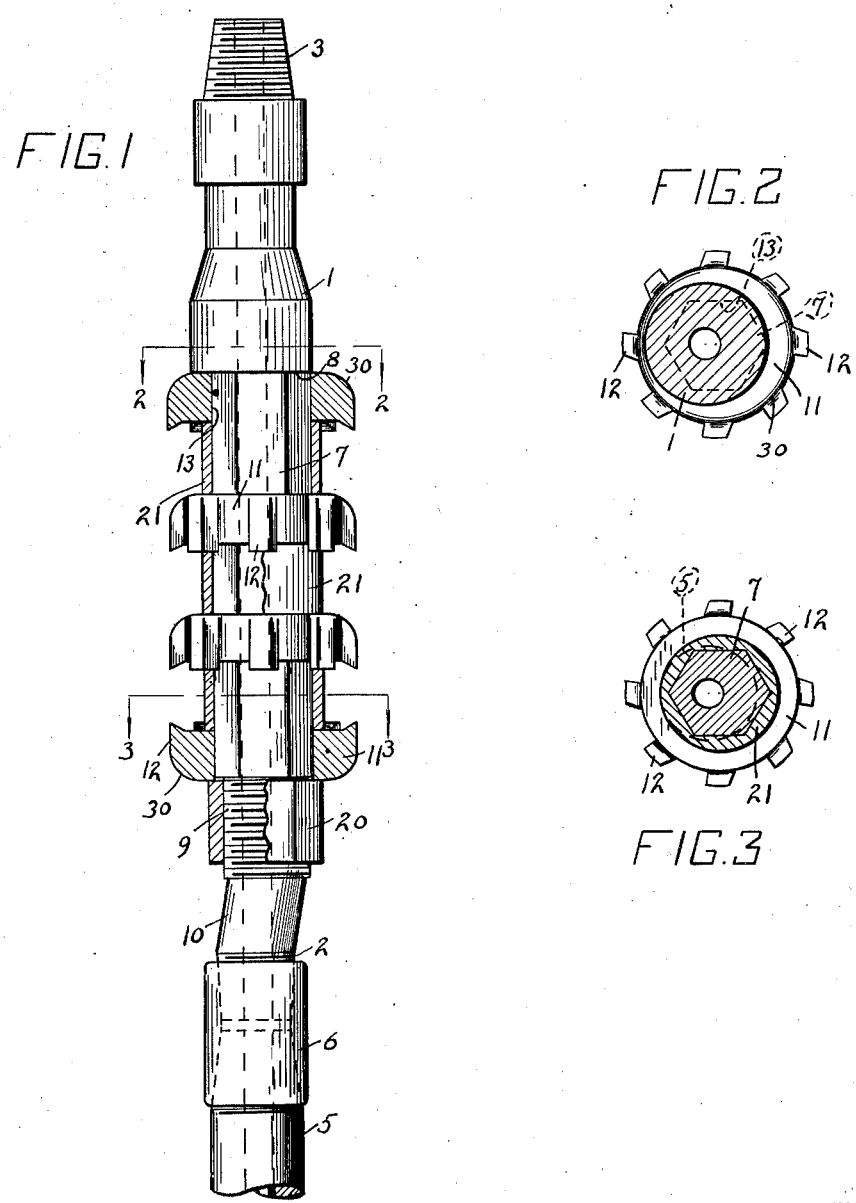

1,754,830

UNITED STATES PATENT OFFICE

JOHN W. MacCLATCHIE, OF COMPTON, CALIFORNIA

UNDERREAMER

Application filed November 20, 1926. Serial No. 149,582.

This invention is an under-reamer for deep well drilling; and it is the object of the invention to provide a cutting element with a concentric bore mounted on a mandrel which is offset with relation to the axis of the drill pipe, in order to form an eccentric peripheral cutting surface for making an offset cut.

It is a further object of the invention to form the supporting mandrel and the bore of the cutting element of a corresponding cross-sectional contour which is non-circular, thereby providing a simple but practical means for locking the cutter against turning on the mandrel and thus assuring operative rotation of the cutter with the mandrel when the latter is turned by the drill pipe.

By thus locking the concentric cutter on an eccentric mandrel an offset cut is made by that portion of the peripheral cutting surface which is of maximum eccentric projection; and it is a still further object of the invention to provide for circumferential adjustment of the cutter when locking it on the mandrel, to cause maximum eccentric projection of different portions of the peripheral cutting surface and thus distribute the cutting wear around the entire circumference of the cutter.

It is a still further object of the invention to provide interchangeable cutters adapted for mounting in axially spaced relation on the offset mandrel; and preferably to curve one face of each of the cutters at its peripheral cutting surfaces, so that the end cutters may be mounted on the mandrel with their respective curved surfaces in distant relation for making initial engagement with the bore of the well as the drill pipe is raised or lowered, thereby guiding the under-reamer in the well bore without the liability of it sticking.

Further objects of the invention will be readily understood from the following description of the accompanying drawings, in which:

Fig. 1 is a side elevation of the under-reamer, partly in axial section.

Figs. 2 and 3 are transverse sections on the lines 2—2 and 3—3 of Fig. 1.

The under-reamer comprises a supporting means adapted for mounting in a string of drill pipe and having one or more cutting elements mounted thereon; the supporting means including ends 1 and 2 adapted for axial alinement with the string of drill pipe and suitably connected thereto, as for example by a usual tapering threaded pin 3 projecting beyond end 1 and adapted to engage a corresponding box on the next adjacent length of drill pipe (not shown), and a threaded engagement on the end 2 adapted for connection to drill pipe 5 by a usual coupling 6.

The medial portion of the supporting means forms an axially offset mandrel 7; and the end 1 provides an undercut shoulder 8 at its junction with the eccentric mandrel, while the opposite end of the offset mandrel is connected by a threaded prolongation 9 and an inclined extension 10 to the axially alined end 2.

A cutter 11 having peripheral teeth 12 and an axial bore 13 is mounted on mandrel 7, the peripheral cutting surface formed by the teeth 12 being concentric with the bore 13, so that when mounted on the offset mandrel the peripheral cutting surface is eccentric to the axis of the string of drill pipe as shown in Fig. 2.

The cutter 11 is locked against turning on mandrel 7, and for this purpose the bore of the cutter and the mandrel may be of any corresponding cross-sectional contour which is non-circular, thereby rotating the cutter with the string of drill pipe and causing an offset cut by that portion of the peripheral cutting surface which is of maximum eccentric projection with relation to the axis of the drill pipe.

In order to adjust the cutter on the mandrel so that different portions of its peripheral cutting surface will be at the cutting point of maximum eccentric projection, the contour of mandrel 7 and bore 13 is such as to permit mounting of the cutter on the mandrel in various circumferentially adjusted positions; and as an instance of this arrangement the mandrel bore may be hexagonal in cross-section as shown in Figs. 2 and 3, although any other non-circular contour permitting circumferential adjustment of the cutter may be employed.

The cutter is mounted on the mandrel by slipping it over end 2 when the latter is disengaged from coupling 6, and the cutter clamped in place between shoulder 8 and a nut 20 which is threaded onto prolongation 9 of the mandrel. In practice a plurality of interchangeable cutters are preferably mounted on the mandrel; the drawings of the invention showing such a construction, with the various cutters axially spaced by sleeves 21 mounted on the mandrel between the respective cutters.

The cutters are preferably constructed so as to permit raising and lowering the string of drill pipe in a well without liability of the cutters engaging and being held by any accidental obstruction such as would tend to cause sticking of the string of drill pipe. For this purpose at least one face of each of the cutters 11 is preferably rounded off at its toothed periphery as shown at 30; and the plurality of interchangeable cutters are mounted on the mandrel with the end cutters reversed relative to one another as shown in Fig. 1, so that the curved surface 30 of one or the other of said end cutters will make initial engagement with the wall of the well bore as the string of drill pipe is raised or lowered, in order to guide the under-reamer past any obstruction.

The invention as thus described provides for adjustment of the cutters so that the point of maximum eccentric projection is at different parts of the peripheral cutting surface to cause uniform wear of the teeth 12 and thus prolong the life of the cutters; and the mounting of the cutters on an offset mandrel provides the desired eccentric cutting surface at minimum expense since the cutters need not be eccentrically bored or provided with teeth of different lengths. Furthermore the improved construction provides extremely simple but practical means for locking the cutters against turning on the mandrel so as to insure operation of the under-reamer when the string of drill pipe is rotated.

I claim:

1. A reamer comprising rotatable supporting means having an axially offset portion forming a mandrel which is non-rotatably fixed relative to the supporting means, and a cutter non-rotatably mounted on the offset mandrel for eccentric rotation of the cutter by the supporting means.

2. A reamer comprising rotatable supporting means having axially alined ends adapted for connection to lengths of a string of drill pipe and including an axially offset medial portion integral with said ends and forming a mandrel, and a cutter non-rotatably mounted on the offset mandrel for eccentric rotation of the cutter by the supporting means.

3. A reamer comprising rotatable supporting means having an axially offset portion forming a mandrel which is non-rotatably fixed relative to the supporting means, and a cutter having a bore and a peripheral cutting surface concentric therewith, the bore of the cutter being adapted to receive the offset mandrel for non-rotatable mounting of the cutter on the mandrel so as to eccentrically rotate the cutter by the supporting means.

4. A reamer comprising a rotatable supporting means having an axially offset portion forming a mandrel which is non-rotatable relative to the supporting means, and a cutter having a bore adapted for mounting on the mandrel, said mandrel and cutter bore being of a corresponding cross-sectional contour which is non-circular to prevent turning of the cutter on the mandrel.

5. A reamer comprising rotatable supporting means having an axially offset portion forming a mandrel which is non-rotatable relative to the supporting means, and a cutter having a bore and a peripheral cutting surface concentric therewith, the bore of the cutter being adapted for mounting on the mandrel and arranged for circumferential adjustment of the cutter relative to the mandrel and non-rotation of the cutter on the mandrel when so adjusted.

6. A reamer comprising an eccentrically rotatable mandrel and a cutter having a bore and a peripheral cutting surface concentric therewith, the bore of the cutter being adapted for mounting on the mandred and arranged for circumferential adjustment of the cutter relative to the mandrel and non-rotation of the cutter on the mandrel when so adjusted.

7. A reamer comprising a rotatable supporting means having an axially offset portion forming a mandrel which is non-rotatable relative to the supporting means, and a cutter having a bore adapted for mounting on the mandrel, said mandrel and cutter bore being of a corresponding cross-sectioal contour permitting circumferential adjustment of the cutter on the mandrel and locking said cutter against turning relative to the mandrel when so adjusted.

8. A reamer comprising rotatable supporting means having an axially offset portion forming a mandrel which is non-rotatable relative to the supporting means, and a cutter having a bore and a peripheral cutting surface concentric therewith, the bore of the cutter being adapted for mounting on the mandrel, and the mandrel and cutter bore being of a corresponding polygonal cross-sectional contour permitting circumferential adjustment of the cutter on the mandrel and locking the cutter against turning relative to the mandrel when so adjusted.

9. A reamer comprising rotatable supporting means having an axially offset portion forming a mandrel which is non-rotatable relative to the supporting means, a cutter adapted for axial reception on the offset mandrel for non-rotatable mounting thereon so as to eccentrically rotate the cutter by the supporting means, and means for locking the cutter against axial displacement on the mandrel.

In testimony whereof he has affixed his signature.

JOHN W. MacCLATCHIE.